UNITED STATES PATENT OFFICE.

GEORGE M. LITTLE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRODE FOR ARC-LAMPS.

1,148,696.

Specification of Letters Patent. Patented Aug. 3, 1915.

No Drawing. Application filed March 2, 1910. Serial No. 546,347.

*To all whom it may concern:*

Be it known that I, GEORGE M. LITTLE, a citizen of the United States, and a resident of Pittsburgh, in the county of Allegheny and State of Pennsylvania, have invented a new and useful Improvement in Electrodes for Arc-Lamps, of which the following is a specification.

My invention relates to electrodes for arc lamps, and particularly to such electrodes as contain an oxid or oxids of one or more metals, such, for example, as the oxids of iron, titanium and chromium.

The object of my invention is to provide an electrode of the character indicated that shall be consumed at a uniform rate throughout its length, and one that will give an arc of greater and more uniform luminosity than electrodes of a similar nature that have been heretofore provided.

An electrode which has recently come into common use contains magnetic oxid of iron ($Fe_3O_4$) as the predominant constituent, chrominum oxid ($Cr_2O_3$), which, by reason of its very high fusing point, assists in preventing rapid consumption of the electrode and flickering of the arc, and titanium dioxid ($TiO_2$), or another compound of titanium, which imparts color and brilliancy to the arc and also assists in prolonging the life of the electrode. It has been found in practice that electrodes of this character are often not consumed at a uniform rate from end to end thereof; that is, the electrodes are more rapidly consumed when first placed in the lamps than after they have been partially consumed. The arc has also been found to be more luminous when the electrodes are new than when they are partially consumed. The probable reason for the non-uniformity both in the rate of consumption and in the luminosity is that the percentage of chromium in the fused slag, that forms upon the ends of the electrodes, gradually increases because it is less readily vaporized than the other constituents. In attempting to overcome this difficulty with electrodes, I have found that a small percentage of boracic acid in the above-stated composition appears to cause fusing and vaporization of the chromium at substantially the same rate as the other constituents of the electrode, so that an increase in the percentage of chromium in the slag that forms upon the ends of the electrodes does not occur. Consequently, the electrodes are consumed at a uniform rate from end to end thereof, and the light given by the arcs when the electrodes are new is substantially the same as when the electrodes have been partially, or almost wholly, consumed. The boracic acid also increases the size of the luminous portion of the arc with relation to the relatively dark portion thereof, so that the volume of the light, or the total luminosity of the arc, is increased.

While the constituent materials of the electrodes may be employed in other quantities or percentages, the composition which I prefer to employ is as follows: 60 parts of magnetic oxid of iron ($Fe_3O_4$), 27 parts of titanium oxid ($TiO_2$), 9 parts of ferrous chromite ($Cr_2O_3.FeO$), up to .5 parts of sodium fluorid (NaFl), up to 5 parts of boracic acid ($H_3BO_3$).

In addition to the advantages above set forth, which may be secured by the use of boracic acid in the composition of the electrodes, the said ingredient is also useful as a flux when such electrodes are manufactured by squirting or molding and subsequent baking. It facilitates the squirting or molding operation of the electrodes, and assists in the sintering and adhesion of the other constituents during baking, so that a strong and compact electrode is produced.

I claim as my invention:

1. An arc lamp electrode containing ferruginous, titaniferous and chromiferous materials, and boracic acid.

2. An arc lamp electrode containing ferruginous, titaniferous and chromiferous materials, and a relatively small percentage of boracic acid.

3. An arc lamp electrode containing ferruginous, titaniferous and chromiferous materials, and boracic acid, the said substances being employed in the order named in progressively decreasing amounts.

4. An arc lamp electrode containing ferruginous, titaniferous and chromiferous materials which are employed in the order named in progressively decreasing amounts, and a sufficient amount of boracic acid to cause the chromiferous material to be consumed uniformly during the burning of the electrode.

In testimony whereof, I have hereunto subscribed my name this 28th day of Feb., 1910.

GEORGE M. LITTLE.

Witnesses:
B. B. HINES,
IRENE WOLFENDALE.